United States Patent [19]

Drager et al.

[11] Patent Number: 4,654,493
[45] Date of Patent: Mar. 31, 1987

[54] SLIDING SWITCH

[75] Inventors: Hubert Drager, Nuremberg; Edwin Lassle, Langenau, both of Fed. Rep. of Germany

[73] Assignee: Diehl GmbH & Co., Nuremberg, Fed. Rep. of Germany

[21] Appl. No.: 760,996

[22] Filed: Jul. 31, 1985

[30] Foreign Application Priority Data

Aug. 13, 1984 [DE] Fed. Rep. of Germany ... 8424008[U]

[51] Int. Cl.⁴ ............................................... H01H 9/04
[52] U.S. Cl. ................................................. 200/302.1
[58] Field of Search ................ 200/302.1, 302.2, 302.3

[56] References Cited

U.S. PATENT DOCUMENTS 3,278,963  10/1966  Bond ................................ 200/302.1

FOREIGN PATENT DOCUMENTS 2562321  10/1985  France ............................. 200/302.2
1325922   8/1973  United Kingdom ............. 200/302.2
2132819   7/1984  United Kingdom ............. 200/302.2

Primary Examiner—Charles E. Phillips
Assistant Examiner—Renee S. Luebke
Attorney, Agent, or Firm—Scully, Scott, Murphy & Presser

[57] ABSTRACT

A sliding switch for manually controlling a socket-plug timer which is protected so as to be at least splash-proof to water, including a housing constituted of at least two parts, which is sealed through the intermediary of a sealing strip squeezed in between the joining locations of the housing parts. One of the housing parts is provided in the region of the joining parts with an access or through-opening which is open towards the sealing strip for a preferably round actuating pusher of the sliding switch, and in which the sealing strip includes a ring-shaped formation in the region of the access opening, through which the actuating pusher is sealed with respect to the access opening.

6 Claims, 3 Drawing Figures

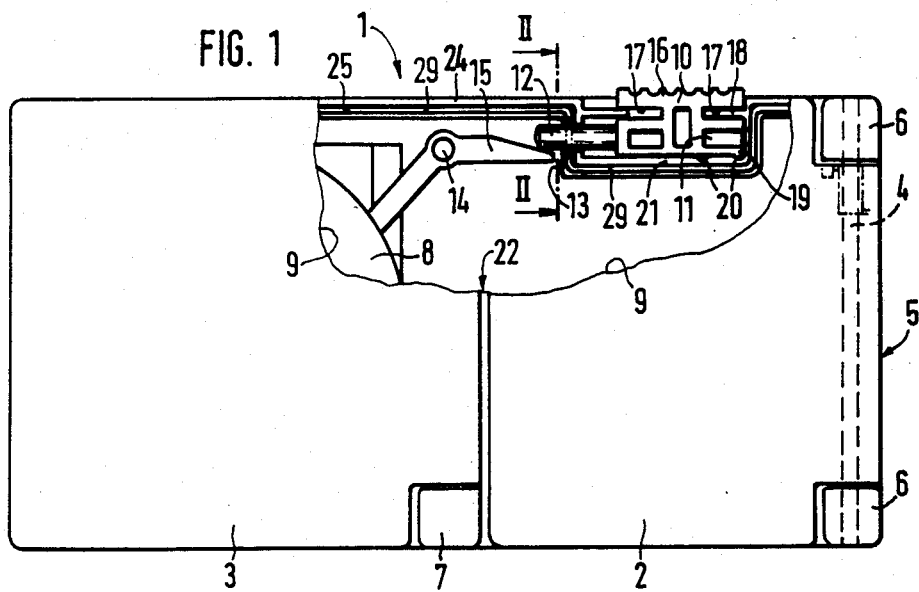
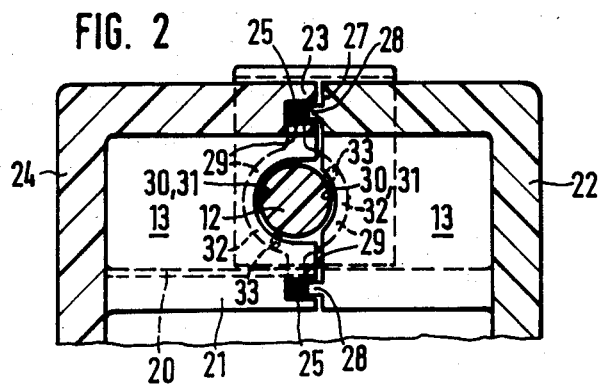
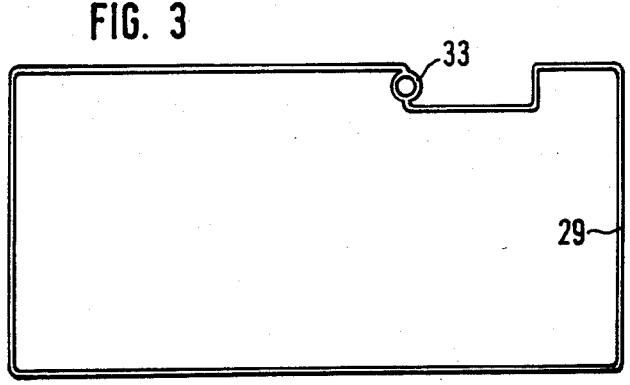

SLIDING SWITCH

BACKGROUND OF THE INVENTION

1. Field of the Invention

The present invention relates to a sliding switch for manually controlling a socket-plug timer which is protected so as to be at least splash-proof to water, including a housing constituted of at least two parts, which is sealed through the intermediary of a sealing strip squeezed in between the joining locations of the housing parts.

2. Discussion of the Prior Art

Sliding switches of that type in socket-plug timers are known and presently marketed. Thus, a timer which is commercialized by the present applicants under the registered trademark "Multimat" includes a manually operable lateral sliding switch which is latchable in two positions. Hereby, in one of these positions, the switching arrangement of the timer is so acted upon that it is constantly closed (switched on). In the other position, the switching arrangement is exclusively controlled from a programming disc of the timer.

Furthermore, it is generally known that for the provision of protection against water penetrating through the joining locations of a plurality of parts, sealing strips can be introduced intermediate these parts.

SUMMARY OF THE INVENTION

Accordingly, it is an object of the present invention to provide, in a sliding switch for a timer, the simplest possible assemblable sealing system for the necessary access or passage through a housing wall of the timer.

In order to achieve the foregoing, a sliding switch of the above-mentioned type has one of the housing parts provided in the region of the joining parts with an access or through-opening which is open towards the sealing strip for a preferably round actuating pusher of the sliding switch, and in which the sealing strip includes a ring-shaped formation in the region of the access opening, through which the actuating pusher is sealed with respect to the access opening.

Hereby, there is afforded an extremely simple assembly of that type of timer with a sliding switch. The sealing strip can be positioned on one of the housing parts, preferably on that part which includes the access opening. Thereafter, the actuating pusher can be slid through the ring-shaped formation on the sealing strip, and the further housing part mounted thereon. Through the subsequent tightly-fitted interconnection of the two housing parts, the sealing strip is then squeezed together to such an extent between the edge of the access opening and the actuating pusher, whereby there is achieved a complete sealing allowing for permissible actuating forces during a displacement of the actuating pusher.

Thus, because of the unitary construction of the sealing strip, especially when it additionally is closed in a ring-shaped configuration and constructed from a preform, there is further enhanced the adaptability thereof to assembling purposes.

BRIEF DESCRIPTION OF THE DRAWINGS

Further advantages of the invention can now be ascertained from the following detailed description of an exemplary embodiment thereof, taken in conjunction in the accompanying drawings; in which:

FIG. 1 illustrates generally schematically a water-protected socket-plug timer with a sliding switch;

FIG. 2 illustrates, on an enlarged scale, a sectional view of the region of the actuating pusher taken along line II—II as shown in FIG. 1; and FIG. 3 illustrates a schematic representation of a preferred exemplary embodiment of the sealing strip.

DETAILED DESCRIPTION

A socket-plug timer 1 which is preferably constructed as shown in FIG. 1 in a front view, includes two cover parts 2, 3, each of which, by means of a pivot axle 4 (only shown for the coverpart 2), can be hingably retained on supports 6, 7 which are formed on the switch housing 5. The one cover part 2 hereby protects a socket plug (not shown) against splashing water, whereas the other cover part 3 correspondingly protects a switch plate 8 which is arranged therebelow.

The socket-plug timer 1 is illustrated in FIG. 1 with a break-through 9 in the front side of the cover parts 2, 3 to show the timer housing therebelow. By means of this break-through 9, there is afforded an overview of a sliding switch 10, which is slidably arranged within a chamber 11 which is formed, within the outline, into the timer housing 5. Formed on the sliding switch 10 is an actuating pusher 12 which passes through a wall 13 of the chamber 11 and exerts a force against a transfer or relaying lever 15 which is movable about a point of rotation 14. This transfer lever 15 acts directly on the switching mechanism (not shown) of the socket-plug timer 1, which is located below the switching plate 8.

The sliding switch 10, which is preferably constructed integrally with the actuating pusher 12, incorporates slot-shaped cutouts 17 below a manipulating knob 16, into which the wall sections 18 which are provided with an opening and which close off the chamber 11 with respect to the exterior, and which project at least partly such that the sliding switch 10 is guided along its direction of displacement in parallel with these wall sections 18. Furthermore, the sliding switch 10 includes a latching projection 19 which engages into corresponding cutouts 20 in the inwardly directed wall 21 of the chamber 11 in the applicable latching position.

Preferably, the socket-plug timer 1 is provided with a two-part housing 5, in which the previously mentioned supports 6, 7 are formed on the upper housing part 22.

A joining part 23 of the lower housing portion 24 in the form of a wall closure with a groove 25 formed therein is visible through the break-out 9 on the front side shown in FIG. 1. Into the groove 25 there is inserted a sealing strip which extends over all joining parts of the two-part housing. In particular, this sealing strip also seals the actuating pusher 12 which passes through the wall 13 of the chamber 11. The sealing strip is preferably conducted along the chamber walls which face towards the interior of the timer 1; however, not along the wall sections 18 which guide the sliding switch 10. This is elucidated in greater detail hereinbelow on the basis of FIG. 2 with the use of the same reference numerals.

FIG. 2 illustrates a sectional view through the side wall of the timer housing 5 and the actuating pusher 12 immediately in front of the wall 13 of the chamber 11, as is shown in FIG. 1. The illustration in FIG. 2 is shown on an enlarged scale relative to FIG. 1, but is not drawn on an exact scale. FIG. 2 illustrates the lower housing part 24, in which the wall closure facing the upper housing part 22 as a joining part 23 incorporates a groove 25 formed therein. The upper housing part 22 possesses, as a joining part 27, a spring 28 which fits into the groove 25, which spring, however, is shorter in length than the depth of the groove 25. This difference is filled out by a sealing strip 29, preferably an O-ring, which is compressed during the joining together of the housing parts 22, 24, and as a result, the joining parts 23, 27 and thereby also the housing parts 22, 24, will be sealed with respect to each other.

As can be further ascertained from FIG. 2, the chamber 11 for the switching slider 10, of which, in this instance, there is only visible the wall 13 and the manipulating knob 16, is formed into both housing parts 22, 24. This chamber 11, as already mentioned hereinabove, is protected with respect to water only by its walls facing the interior of the timer housing. For this purpose, the upper housing part 22 and the lower housing part 24 are so configured at their joining parts 23, 27 in the region of the chamber walls, as has been described hereinabove for an external wall.

An exception thereto is merely provided by the wall 13 of the chamber 11, which incorporates an access or through-opening 30 for the actuating pusher 12. This through-opening 30, just as the wall 13, belongs partly to the upper housing part 22 and partly to the lower housing part 24. When the two housing parts 22, 24 as shown in FIG. 2, are joined together, then the through-opening 30 possess the same geometric outline as the preferably circular cross-section of the actuating pusher 12, but is slightly larger.

The wall 13 incorporates a shallow groove 32 in the narrow side walls 31 in region of the through-opening 30 facing the actuating pusher 12. This groove 32 receives a ring-shaped formation 33 of the sealing strip 29 in such a manner as to project above the edge of the shallow groove 32, and at least when the housing parts 22, 24 are joined together, will be pressed from all sides thereof against the actuating pusher 12. This pressing in the region of the ring-shaped formation 33 of the sealing strip 29 is hereby so designed, that the through-opening 30, upon the actuating pusher 12 being inserted therein, is adequately protected against water, and concurrently will not raise the actuating force required for a displacement of the actuating lever 12 beyond an acceptable level.

Finally, FIG. 3 illustrates a preferred embodiment of the sealing strip 29 with the ring-shaped formation 33. The sealing strip 29, which is preferably constructed as an O-ring, is unitarily constructed, closed in a ring-shape, and is preformed in conformance with FIG. 1 (shown at a reduced scale). Hereby, it allows itself to be extremely simply inserted into the lower housing part 24. The sealing strip 29 is preferably so produced that the ring-shaped formation 33 must be rotated through 90° during the assembling, and then stands normal to the plane of the drawing.

What is claimed is:

1. A switch assembly for manually controlling the switching position of a socket-plug timer, including a housing having at least first and second housing parts, and a water sealing strip captured between said housing parts, the improvement comprising:
    the housing including a through opening adjacent to the sealing strip;
    an actuating pusher extending through said through opening for moving the socket-plug timer;
    the sealing strip comprising a one piece, integrally formed closed loop, said closed loop including a ring portion extending around the actuating pusher, between the actuating pusher and the housing and engaging the actuating pusher and the housing so as to seal the interface therebetween;
    the first housing part includes a perimeter and a first peripheral groove extending along said perimeter;
    the housing forms a second groove extending at least partially around the actuating pusher;
    the sealing strip includes a main portion held in the first peripheral groove;
    the second housing part includes a tongue extending into the groove to hold the sealing strip therein; and
    the ring portion of the sealing strip is held in said second groove.

2. A sliding switch assembly as claimed in claim 1, wherein the sealing strip comprises an O-ring.

3. A switch assembly according to claim 1 wherein the second groove extends substantially completely around the actuating pusher.

4. A switch assembly according to claim 3, wherein:
    the main portion of the sealing strip lies in a first plane; and
    the ring portion of the sealing strip lies in a second plane, perpendicular to the first plane.

5. A switch assembly according to claim 4, wherein the second groove includes:
    a first groove portion formed in the first housing part; and
    a second groove portion formed in the second housing part.

6. A switch assembly as claimed in claim 1 wherein:
    the housing forms a substantially enclosed interior;
    at least the first housing part includes first and second wall portions forming an outwardly opening chamber, located outside the interior of the housing, for receiving a sliding switch to move the actuating pusher;
    the first wall portion is located between the chamber and the interior of the housing, and the second wall portion is located between the chamber and an exterior of the housing;
    the sealing strip engages the first wall portion to seal an interface between said first wall portion and the second housing part; and
    the sealing strip is spaced from the second wall portion.

* * * * *